US012505723B2

(12) United States Patent
Singh et al.

(10) Patent No.: US 12,505,723 B2
(45) Date of Patent: Dec. 23, 2025

(54) ASSEMBLING AND DEPLOYING COMPUTING TASKS LEVERAGING SWARM INTELLIGENCE

(71) Applicant: Bank of America Corporation, Charlotte, NC (US)

(72) Inventors: Shailendra Singh, Maharashtra (IN); Saurabh Gupta, New Delhi (IN)

(73) Assignee: Bank of America Corporation, Charlotte, NC (US)

( * ) Notice: Subject to any disclaimer, the term of this patent is extended or adjusted under 35 U.S.C. 154(b) by 99 days.

(21) Appl. No.: 18/379,209

(22) Filed: Oct. 12, 2023

(65) Prior Publication Data

US 2025/0124769 A1    Apr. 17, 2025

(51) Int. Cl.
*G07F 19/00* (2006.01)
*G06Q 20/38* (2012.01)

(52) U.S. Cl.
CPC ......... *G07F 19/209* (2013.01); *G06Q 20/389* (2013.01)

(58) Field of Classification Search
CPC ...... G07F 19/20; G07F 19/206; G07F 19/207; G07F 19/208; G07F 19/209; G07F 19/211; G06Q 20/389; G06Q 20/1085
See application file for complete search history.

(56) References Cited

U.S. PATENT DOCUMENTS 10,810,562 B1 * 10/2020 McKinnon ......... G06Q 20/1085
2019/0347631 A1 * 11/2019 Mossoba ............. G06Q 20/382

\* cited by examiner

*Primary Examiner* — Laura A Gudorf
(74) *Attorney, Agent, or Firm* — Weiss & Arons LLP

(57) ABSTRACT

Apparatus and methods for assembling and deploying computing tasks using swarm intelligence are provided. A swarm intelligence network program may be installed on multiple automated teller machines ("ATMs") within a geographical area. When one of the ATMs loses connectivity with its financial institution, the ATM may create an ad-hoc swarm intelligence-based network with the other ATMs. The ad-hoc network may include a distributed ledger. The ATM may determine that a customer request for a financial transaction is valid and complete the request and record the transaction on the distributed ledger. The ATM may use hardware and software resources from the other ATMs on the ad-hoc network.

20 Claims, 6 Drawing Sheets

ASSEMBLING AND DEPLOYING COMPUTING TASKS LEVERAGING SWARM INTELLIGENCE

FIELD OF TECHNOLOGY

Aspects of the disclosure relate to providing apparatus and methods for leveraging swarm intelligence to assemble and deploy computing tasks, including transactions.

BACKGROUND OF THE DISCLOSURE

Financial institutions and their customers use automated teller machines ("ATM"s) for multiple varied tasks. These tasks may include, inter alia, receiving cash, depositing checks, checking balances, and communicating between a financial institution and a customer.

Generally, ATMs are required to be in constant or near-constant communication with their controlling financial institution to function correctly. Communication may be through a network, such as a dedicated network, an intranet, or the Internet.

When an ATM or similar computer loses connection with its controlling financial institution, customers may face significant inconveniences and potential financial difficulties. Loss of connectivity may hinder a customer's ability to access funds, make transactions, and manage their finances.

Loss of connectivity may also create operational challenges for the financial institution and may negatively impact performance, customer satisfaction, and loyalty.

Loss of connectivity may prevent a system administrator from performing system maintenance, upgrades, and from securing the ATM from malicious activities.

Therefore, it is necessary to address the issue of ATM loss of connectivity promptly and effectively to ensure uninterrupted and secure banking services for customers.

Currently, there is no apparatus or method available to solve the loss of connectivity by assembling and deploying computing tasks on an ATM using swarm intelligence, artificial intelligence, and a distributed ledger.

Therefore, it would be desirable for apparatus and methods for leveraging swarm intelligence to assemble and deploy computing tasks.

SUMMARY OF THE DISCLOSURE

It is an object of this disclosure to provide apparatus and methods for a swarm intelligence ATM network to assemble and deploy computing tasks.

A swarm intelligence computer program product installed on an automated teller machine ("ATM") is provided. The computer program product may include executable instructions. The executable instructions may be executed by a processor on the ATM or other computer system.

The instructions may determine when the ATM loses connectivity with a network run by a financial institution.

The instructions may detect one or more additional ATMs within a pre-determined geographical distance. Each additional ATM may include a copy of the swarm intelligence computer program product.

The instructions may create an ad-hoc network with the one or more additional ATMs. The ad-hoc network may include one or more swarm intelligence rules.

The instructions may initiate a distributed ledger on the ad-hoc network. The ATM may be one node on the distributed ledger. Each additional ATM may be another node on the distributed ledger.

The instructions may receive one or more financial transactions from a customer input on the ATM.

The instructions may analyze the one or more financial transactions and determine when the one or more financial transactions satisfy one or more pre-determined rules.

The instructions may complete the one or more financial transactions that satisfy the one or more pre-determined rules.

The instructions may record the one or more financial transactions on the distributed ledger.

In an embodiment, the distributed ledger may be a blockchain.

In an embodiment, the blockchain may be conclave.

In an embodiment, the instructions may further analyze each node's computing resources and determine if there are any unused computing resources on the one or more additional ATMs.

In an embodiment, the instructions may further determine when the unused computing resources are available for use by the ATM.

In an embodiment, the instructions may determine when the one or more financial transactions satisfy one or more pre-determined rules by utilizing the unused computing resources.

In an embodiment, the instructions may automatically modify the pre-determined geographical distance based on one or more factors or analyses.

In an embodiment, the instructions may automatically enlarge the pre-determined geographical distance when a total of additional ATMs is below a threshold value.

In an embodiment, the threshold value may be ten.

In an embodiment, the instructions may index and record a hardware profile of each ATM on the ad-hoc network at a pre-determined interval.

In an embodiment, the instructions may index and record a software profile of each ATM on the ad-hoc network at a pre-determined interval.

In an embodiment, the instructions may further create a pool of hardware resources available for an ATM on the ad-hoc network to utilize.

In an embodiment, the data on the ad-hoc network may be encrypted.

In an embodiment, the encryption may be homomorphic.

In an embodiment, the instructions may analyze one or more hardware needs of each ATM on the ad-hoc network.

In an embodiment, the instructions may automatically prioritize the one or more hardware needs.

In an embodiment, the instructions may use one or more artificial intelligence/machine learning ("AI/ML") algorithms.

In an embodiment, the ad-hoc network may include or follow one or more swarm intelligence network rules.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION OF THE DISCLOSURE

Figure 1:
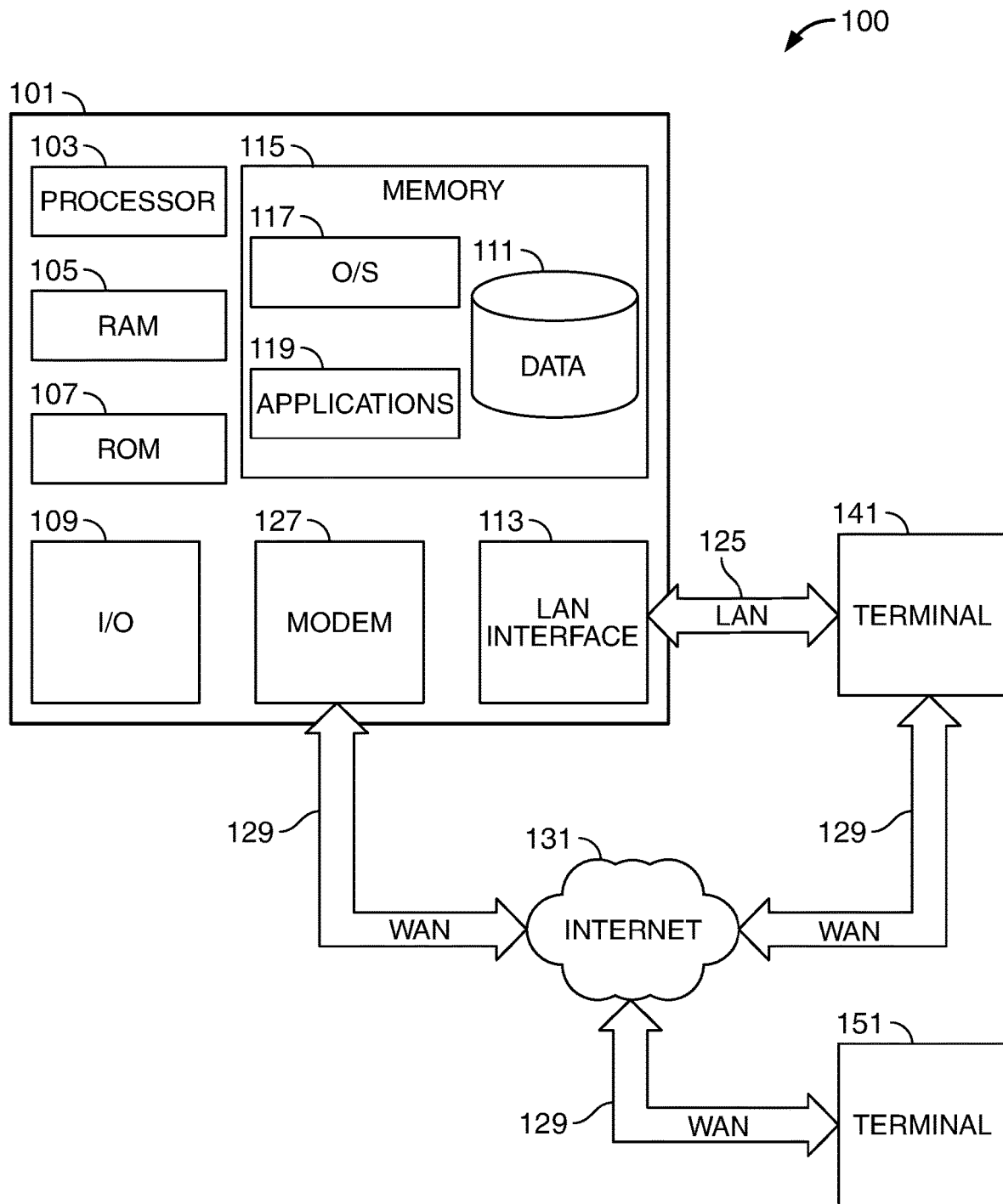
FIG. 1 shows an illustrative apparatus in accordance with principles of the disclosure.

It is an object of this disclosure to provide apparatus and methods for a swarm intelligence ATM network to assemble and deploy computing tasks during a lack of connectivity with a standard network.

A swarm intelligence computer program product installed on an automated teller machine ("ATM") is provided. The ATM may include all components typically found with an ATM, such as a computer, a display screen, a money box, a deposit slot, input interface(s), and other components.

The computer program product may include executable instructions. The executable instructions may be executed by a processor on the ATM or other computer system. References to the "the instructions" may refer to the computer program product.

Multiple processors may increase the speed and capability of the program. The executable instructions may be stored in non-transitory memory on the ATM or a remote computer system, such as a server.

Other standard components of a computer system may be present. A more powerful computer may increase the speed at which the computer program may run.

The term "non-transitory memory," as used in this disclosure, is a limitation of the medium itself, i.e., it is a tangible medium and not a signal, as opposed to a limitation on data storage types (e.g., RAM VS. ROM). "Non-transitory memory" may include both RAM and ROM, as well as other types of memory.

The computer may include, among other components, a communication link, a processor or processors, and a non-transitory memory configured to store executable data configured to run on the processor. The executable data may include an operating system and the swarm intelligence program.

A processor or processors may control the operation of the computer system and its components, which may include RAM, ROM, an input/output module, and other memory. The microprocessor(s) may also execute all software running on the apparatus and computer system. Other components commonly used for computers, such as EEPROM or Flash memory or any other suitable components, may also be part of the apparatus and computer system.

A communication link may enable communication with other computers, other ATMs, and servers, as well as enable the program to communicate with databases. The communication link may include any necessary hardware (e.g., antennae) and software to control the link. Any appropriate communication link may be used, such as Wi-Fi, bluetooth, LAN, and cellular links. Multiple communication links may be present. In an embodiment, the network used to communicate with a financial institution may be the Internet. In another embodiment, the network may be an internal intranet or other internal network.

In various embodiments, the computer system may be a server. The computer program may be run on a smart mobile device.

To create the swarm network, the computer program, or portions of the computer program may be linked to other computers or servers running the computer program. The server or servers may be centralized or distributed. Centralized servers may be more powerful and secure than distributed servers but may also be more expensive and less resilient.

The instructions may determine when the ATM loses connectivity with a network run by a financial institution. The network run by the financial institution may allow the ATM to serve customers, as well as allow the financial institution to remotely monitor, secure, and upgrade the ATM.

Any method to determine connectivity may be used, such as sending and receiving a ping or other packet of data at pre-determined intervals (every second, every minute, etc.).

The instructions may detect one or more additional ATMs within a pre-determined geographical distance. In an embodiment, this detection may be performed before the ATM loses connectivity with the network. The pre-determined geographical distance may be a radius (forming a circle) or may form any other shape. In an embodiment, the program may automatically modify the pre-determined distance. The distance may be pre-determined to include a minimum number of ATMs to form a viable swarm network. The distance may be pre-determined to include less than a maximum number of ATMs to form a viable and fast swarm network.

Each additional ATM may include a copy of the swarm intelligence computer program product. To become part of the swarm network, each ATM (or other computer) must include a copy of the computer program product in order to run.

Each additional ATM may or may not have connectivity with the financial institution's network.

Each ATM may communicate (and detect other ATMs) using any appropriate communications protocol, such as Wi-Fi, li-fi, bluetooth, cellular networks (3G, 4G, LTE, 5G, etc.), or other communication protocols. The invention may only be practicable where each ATM's communication link (s) are operable.

The instructions may create an ad-hoc network with the one or more additional ATMs. The ad-hoc network may be temporary. One or more ATMs may join or leave the ad-hoc network as necessary.

The ad-hoc network may include one or more swarm intelligence rules or protocols. In this disclosure, swarm intelligence may include swarm robotics. These rules and protocols may be optimizers to determine the fastest and most-efficient use of resources within the network.

Swarm intelligence, when applied to ATM networks, may allow for each ATM to perform and complete higher dimensional and more challenging tasks than an ATM could perform on its own. Swarm intelligence may allow for self-organized networks. Any appropriate swarm intelligence method or algorithm, such as insect (ant, bee, firefly, etc.) algorithms, bacterial based algorithms, and animal (birds, wolves, whales, etc.) behavior-based algorithms, or a combination of swarm intelligence methods or algorithms may be used by the program.

The instructions may initiate a distributed ledger on the ad-hoc network. The ATM may be one node on the distributed ledger. Each additional ATM may be another node on the distributed ledger.

Distributed ledger technology may refer to a decentralized, tamperproof and transactional database. A distributed ledger provides a distributed, immutable, transparent, secure and auditable ledger of changes to a file or document. The distributed ledger can be consulted openly and fully, allowing access to all documents/changes that have occurred since the initialization of the system, and can be verified and collated by any entity with access at any time. The distributed ledger also stores information in a fashion that prevents alteration of the records stored in the distributed ledger.

A conclave distributed ledger/blockchain may refer to a private network or ledger that can only be accessed by users with the appropriate credentials, as opposed to a public blockchain, such as those used for some cryptocurrencies.

The distributed ledger may store information in linked segments, or a chain of "blocks." The linked blocks may collectively form a "blockchain." Each block may store a set of changes performed at a given time. Blocks are linked or chained to each other by a reference to the previous block. Each block in the distributed ledger is linked to the previously approved block using a cryptographic hash code of the previous block.

Security is accomplished by imposing strict rules and mutual agreement among nodes when attempting to add a new block of transactions to the distributed ledger. The strict rules and mutual agreement protocols may be referred to as a consensus mechanism. The consensus mechanism synchronizes the decentralized ledger across all nodes that write to the distributed ledger. The consensus mechanism ensures that all nodes agree on a single authoritative copy of the distributed ledger. Nodes that write to the distributed ledger network may be programmed to recognize the longest chain in a network of nodes as the authoritative source of information for the distributed ledger.

In this disclosure, proof of work and computationally intensive tasks may be unnecessary to add blocks to the blockchain, or add to the distributed ledger, as the disclosure deals with conclave (private) blockchains/ledgers. Any user may make a change to the file or document comprising the blockchain/ledger. The change, along with its metadata (user, time, location, etc.) may be sent as a new block to every other node/user in the blockchain/ledger. Every user/node may approve or disapprove of the change, and that record may be added as a new block to the blockchain/ledger along with its metadata. This may create an immutable record of every change and approval or disapproval.

A malicious actor may not be able to modify any action taken in the past (change or approval/disapproval) as that modified action will not match the other nodes/users records of the blockchain/ledger. In addition, by limiting the nodes/users in a private blockchain, the users may be able to prevent malicious actors from gaining access at all, but that may depend on the strength of the authentication process used to access/login to the ledger/blockchain and any editing/approval session. The distributed nature of the block generation process may provide a tamperproof and auditable transactional database.

The instructions (i.e., the program) may receive one or more financial transactions from a customer input on the ATM. For example, a customer may approach the ATM, which does not have connectivity to the financial institution, to withdraw money, or deposit money. Without a connection to the financial institution, and without the invention described in this disclosure, the ATM may be unable to assist the customer.

The instructions may analyze the one or more financial transactions and determine when the one or more financial transactions satisfy one or more pre-determined rules. The analysis may compare the financial transaction request against the pre-determined rules. The pre-determined rules may be, for example, withdrawal limits, deposit limits, authentication requirements, and other rules. For example, if the customer is requesting a withdrawal of $1000, and the limit is $100, the transaction may be denied.

The instructions may complete the one or more financial transactions that satisfy the one or more pre-determined rules. The instructions may deny or modify requested financial transactions that do not satisfy the one or more pre-determined rules.

The instructions may record the one or more financial transactions (or other actions) on the distributed ledger. Recording the one or more financial transactions on the distributed ledger may create a record of every financial transaction (or other action) for later review, syncing with the financial institution when connectivity is restored, for audits, and for other purposes.

In an embodiment, the instructions may determine that the ATM requires additional computing resources to perform various tasks, such as financial transactions, communications, recording on the ledger, updates, and security. The program may prioritize, using swarm intelligence algorithms, the use of available computing resources. These activities may also be recorded on the distributed ledger.

In an embodiment, the distributed ledger may be a blockchain. As discussed in this disclosure, blockchains may be more secure than a standard ledger.

In an embodiment, the blockchain may be conclave, as discussed in this disclosure. Conclave blockchains may be more secure, by limiting participants, and private than public blockchains.

In an embodiment, the instructions may further analyze each node's computing resources and determine if there are any unused computing resources on the one or more additional ATMs. Before or when an ATM joins the ad-hoc network, each ATM's copy of the computer program product may determine what, if any, resources may be available for use by other nodes on the network. This determination may be dynamic, as the resources available may change over time. These resources may be indexed and combined in a pool of available resources.

In an embodiment, the instructions may further determine when the unused computing resources are available for use by the ATM. Some unused computing resources may be unavailable for use by the ATM due to incompatibility, or communication issues, or other factors.

In an embodiment, the instructions may determine when the one or more financial transactions satisfy one or more pre-determined rules by utilizing the unused computing resources. For example, the ATM may not be able to determine if the one or more requested financial transactions satisfy the pre-determined rules due to lack of computing resources available to dedicate to the task. In this situation, the ATM may use available resources in the pool of available resources by offloading various computing tasks to the additional ATMs.

In an embodiment, the instructions may automatically modify the pre-determined geographical distance based on one or more factors or analyses. For example, if the distance is too small, there may be an insufficient number of additional ATMs to create a viable swarm intelligence-based network. In this situation, the program may automatically expand the geographical distance to discover additional ATMs to add to the ad-hoc network.

In an embodiment, the instructions may automatically enlarge the pre-determined geographical distance when a total of additional ATMs is below a threshold value. For example, if a particular swarm intelligence algorithm requires a minimum of 100 nodes, the program may expand the distance until 100 or more nodes are discovered and added to the ad-hoc network.

In an embodiment, the threshold value may be ten, 100, 1000, or any other appropriate number, depending on the swarm intelligence algorithm(s) used by the program.

In an embodiment, the instructions may index and record a hardware profile of each ATM on the ad-hoc network at a pre-determined interval. A hardware profile may include information about memory, storage, processor(s), communication link(s), and other hardware. This interval may be, for example, once a minute, once an hour or once a day. As hardware does not change often, the interval may be extended.

In an embodiment, the instructions may index and record a software profile of each ATM on the ad-hoc network at a pre-determined interval. A software profile may include information on each software program installed on the ATM, including name and version. This interval may be, for example, once a minute, once an hour or once a day. As software changes more often than hardware, the interval may be shorter than the hardware interval.

In an embodiment, the instructions may further create a pool of hardware resources available for an ATM on the ad-hoc network to utilize. This pool may be static in that it does not change unless a resource is used. This pool may be dynamic in that it is constantly changing as resources become available or unavailable.

In an embodiment, the data on the ad-hoc network may be encrypted. Any appropriate encryption method or algorithm may be used. Encryption may be required to secure the data on the ad-hoc network, especially financial transactions.

In an embodiment, the encryption may be homomorphic. Homomorphic encryption may refer to encryption that allows computations to be performed on data without first decrypting it. This type of encryption allows for nodes on the network to use data without sharing decryption keys. This may be more secure as the actual data may only be decrypted by computers or users with a decryption key, and not every node on the network. If every node on the network can decrypt the data, there may be more opportunities for malicious actors to intercept and learn the data.

In an embodiment, the instructions may analyze one or more hardware needs of each ATM on the ad-hoc network. The needs of each ATM may change dynamically, depending on what each ATM is doing at the moment. This analysis may be constant or at pre-determined intervals.

In an embodiment, the instructions may automatically prioritize the one or more hardware needs. The prioritization may be determined through one or more swarm intelligence algorithms.

In an embodiment, the instructions may use one or more artificial intelligence/machine learning ("AI/ML") algorithms to perform one or more of its tasks. Any suitable AI/ML algorithm may be used. In an embodiment, swarm intelligence algorithms may be considered AI/ML algorithms.

In an embodiment, the ad-hoc network may include or follow one or more swarm intelligence network rules.

An apparatus for a swarm intelligence automated teller machine ("ATM") network is provided. The apparatus may include two or more ATMs within a pre-determined radius.

Each ATM may include a communication link, a processor, and a non-transitory memory.

The non-transitory memory may be configured to store at least an ATM operating system, and a swarm intelligence application.

The swarm intelligence application may be installed on each ATM. The swarm intelligence application may determine when the ATM on which it is installed loses connectivity with a network run by a financial institution.

The swarm intelligence application may detect the one or more other ATMs within the pre-determined radius.

The swarm intelligence application may create an ad-hoc network with the one or more other ATMs. The ad-hoc network may include swarm intelligence rules and protocols.

The swarm intelligence application may initiate a distributed ledger on the ad-hoc network. Each ATM on the ad-hoc network may be one node on the distributed ledger.

The swarm intelligence application may receive one or more financial transactions from a customer. Or the swarm intelligence application may determine that the ATM needs updated software or more computing resources.

The swarm intelligence application may determine when the one or more financial transactions satisfy one or more pre-determined rules.

The swarm intelligence application may complete the one or more financial transactions that satisfy the one or more pre-determined rules. The swarm intelligence application may determine that to complete the one or more financial transactions, the ATM may require additional computing resources.

The swarm intelligence application may record the one or more completed financial transactions on the distributed ledger.

The swarm intelligence application may determine when the ATM requires further processing power to complete one or more computing tasks.

The swarm intelligence application may offload the one or more computing tasks to an ATM on the ad-hoc network with available processing power.

A method for a swarm intelligence ATM network is provided. The method may include the step of installing a swarm intelligence application on an ATM.

The method may include the step of determining, by the application, when the ATM loses connectivity with a network run by a financial institution.

The method may include the step of detecting, by the application, one or more additional ATMs within a pre-determined geographical distance. Each additional ATM may include a copy of the swarm intelligence application.

The method may include the step of creating, by the application, an ad-hoc network with the one or more additional ATMs. The ad-hoc network may include one or more swarm intelligence rules or protocols.

The method may include the step of initiating, by the application, a distributed ledger on the ad-hoc network. Each ATM on the ad-hoc network may be one node on the distributed ledger.

The method may include the step of receiving, at the ATM, one or more requests for financial transactions from a customer.

The method may include the step of determining, by the application, when the one or more financial transactions satisfy one or more pre-determined rules.

The method may include the step of completing, at the ATM, the one or more financial transactions that satisfy the one or more pre-determined rules. Completing the one or more financial transactions may require computing resources from other ATMs on the network.

The method may include the step of recording, by the application, the one or more financial transactions on the distributed ledger.

The method may include the step of determining, by the application, when the ATM requires further computing resources, including processing power, to complete one or more computing tasks.

The method may include the step of offloading the one or more computing tasks to an ATM on the ad-hoc network with available computing resources, such as processing power.

One of ordinary skill in the art will appreciate that the steps shown and described herein may be performed in other than the recited order and that one or more steps illustrated may be optional. Apparatus and methods may involve the use of any suitable combination of elements, components, method steps, computer-executable instructions, or computer-readable data structures disclosed herein.

Illustrative embodiments of apparatus and methods in accordance with the principles of the invention will now be described with reference to the accompanying drawings, which form a part hereof. It is to be understood that other embodiments may be utilized, and that structural, functional, and procedural modifications may be made without departing from the scope and spirit of the present invention.

As will be appreciated by one of skill in the art, the invention described herein may be embodied in whole or in part as a method, a data processing system, or a computer program product. Accordingly, the invention may take the form of an entirely hardware embodiment, or an embodiment combining software, hardware and any other suitable approach or apparatus.

Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

In accordance with principles of the disclosure, FIG. 1 shows an illustrative block diagram of apparatus 100 that includes a computer 101. Computer 101 may alternatively be referred to herein as a "computing device." Computer 101 may be an ATM or part of an ATM. Elements of apparatus 100, including computer 101, may be used to implement various aspects of the apparatus and methods disclosed herein. A "user" of apparatus 100 or computer 101 may include other computer systems or servers or computing devices, such as the program described herein.

Computer 101 may have one or more processors/microprocessors 103 for controlling the operation of the device and its associated components, and may include RAM 105, ROM 107, input/output module 109, and a memory 115. The microprocessors 103 may also execute all software running on the computer 101—e.g., the operating system 117 and applications 119 such as a swarm intelligence program and security protocols. Other components commonly used for computers, such as EEPROM or Flash memory or any other suitable components, may also be part of the computer 101.

The memory 115 may be comprised of any suitable permanent storage technology—e.g., a hard drive or other non-transitory memory. The ROM 107 and RAM 105 may be included as all or part of memory 115. The memory 115 may store software including the operating system 117 and application(s) 119 (such as a swarm intelligence program and security protocols) along with any other data 111 (e.g., historical data, configuration files) needed for the operation of the apparatus 100. Memory 115 may also store applications and data. Alternatively, some or all of computer executable instructions (alternatively referred to as "code") may be embodied in hardware or firmware (not shown). The microprocessor 103 may execute the instructions embodied by the software and code to perform various functions.

The network connections/communication link may include a local area network (LAN) and a wide area network (WAN or the Internet) and may also include other types of networks. When used in a WAN networking environment, the apparatus may include a modem or other means for establishing communications over the WAN or LAN. The modem and/or a LAN interface may connect to a network via an antenna. The antenna may be configured to operate over Bluetooth, wi-fi, cellular networks, or other suitable frequencies.

Any memory may be comprised of any suitable permanent storage technology—e.g., a hard drive or other non-transitory memory. The memory may store software including an operating system and any application(s) (such as a swarm intelligence program and security protocols) along with any data needed for the operation of the apparatus. The data may also be stored in cache memory, or any other suitable memory.

An input/output ("I/O") module 109 may include connectivity to a button and a display. The input/output module may also include one or more speakers for providing audio output and a video display device, such as an LED screen and/or touchscreen, for providing textual, audio, audiovisual, and/or graphical output.

In an embodiment of the computer 101, the microprocessor 103 may execute the instructions in all or some of the operating system 117, any applications 119 in the memory 115, any other code necessary to perform the functions in this disclosure, and any other code embodied in hardware or firmware (not shown).

In an embodiment, apparatus 100 may consist of multiple computers 101, along with other devices. A computer 101 may be a mobile computing device such as a smartphone or tablet, but may preferably be an ATM.

Apparatus 100 may be connected to other systems, computers, servers, devices, and/or the Internet 131 via a local area network (LAN) interface 113.

Apparatus 100 may operate in a networked environment supporting connections to one or more remote computers and servers, such as terminals 141 and 151, including, in general, the Internet and "cloud". These remote computers and servers, terminals 141 and 151 (as well as other terminals, not shown) may be other ATMs. References to the "cloud" in this disclosure generally refer to the Internet, which is a world-wide network. "Cloud-based applications" generally refer to applications located on a server remote from a user, wherein some or all of the application data, logic, and instructions are located on the internet and are not located on a user's local device. Cloud-based applications may be accessed via any type of internet connection (e.g., cellular or wi-fi).

Terminals 141 and 151 may be ATMs, personal computers, smart mobile devices, smartphones, IoT devices, or servers that include many or all of the elements described above relative to apparatus 100. The network connections depicted in FIG. 1 include a local area network (LAN) 125 and a wide area network (WAN) 129 but may also include other networks. Computer 101 may include a network interface controller (not shown), which may include a modem 127 and LAN interface or adapter 113, as well as other components and adapters (not shown). When used in a LAN networking environment, computer 101 is connected to LAN 125 through a LAN interface or adapter 113. When used in a WAN networking environment, computer 101 may include a modem 127 or other means for establishing communications over WAN 129, such as Internet 131. The modem 127 and/or LAN interface 113 may connect to a network via an antenna (not shown). The antenna may be configured to operate over Bluetooth, wi-fi, cellular networks, or other suitable frequencies.

It will be appreciated that the network connections shown are illustrative and other means of establishing a communications link between computers may be used. The existence of various well-known protocols such as TCP/IP, Ethernet, FTP, HTTP, and the like is presumed, and the system can be operated in a client-server configuration. The computer may transmit data to any other suitable computer system. The computer may also send computer-readable instructions, together with the data, to any suitable computer system. The computer-readable instructions may be to store the data in cache memory, the hard drive, secondary memory, or any other suitable memory.

Application program(s) 119 (which may be alternatively referred to herein as "plugins," "applications," or "apps") may include computer executable instructions for a swarm intelligence program and security protocols, as well as other programs. In an embodiment, one or more programs, or aspects of a program, may use one or more swarm intelligence and AI/ML algorithm(s). The various tasks may be related to assembling and deploying computer tasks and transactions over a swarm intelligence ATM network.

Computer 101 may also include various other components, such as a battery (not shown), speaker (not shown), a network interface controller (not shown), and/or antennas (not shown).

Any information described above in connection with data 111, and any other suitable information, may be stored in memory 115. One or more of applications 119 may include one or more algorithms that may be used to implement features of the disclosure, and/or any other suitable tasks.

In various embodiments, the invention may be operational with numerous other general purpose or special purpose computing system environments or configurations. Examples of well-known computing systems, environments, and/or configurations that may be suitable for use with the invention in certain embodiments include, but are not limited to, personal computers, servers, hand-held or laptop devices, tablets, mobile phones, smart phones, other computers, and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, IoT devices, ATMs and the like.

Aspects of the invention may be described in the general context of computer-executable instructions, such as program modules, being executed by a computer. Generally, program modules include routines, programs, objects, components, data structures, etc., that perform particular tasks or implement particular abstract data types. The invention may also be practiced in distributed computing environments where tasks are performed by remote processing devices that are linked through a communications network, e.g., cloud-based applications. In a distributed computing environment, program modules may be located in both local and remote computer storage media including memory storage devices.

Figure 2:
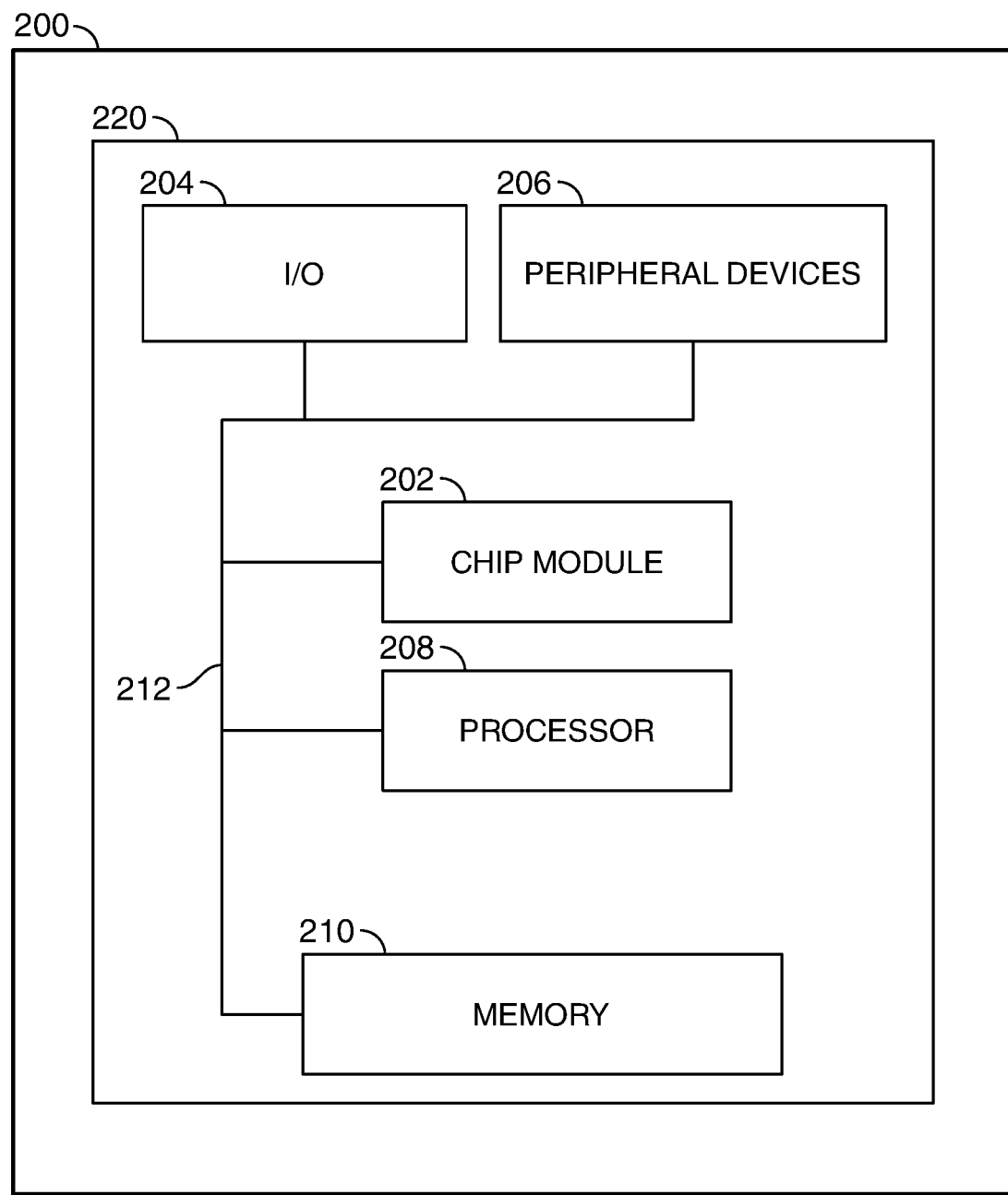
FIG. 2 shows an illustrative apparatus in accordance with principles of the disclosure.

FIG. 2 shows illustrative apparatus 200 that may be configured in accordance with the principles of the disclosure. Apparatus 200 may be an ATM, a server, or computer with various peripheral devices 206. Apparatus 200 may include one or more features of the apparatus shown in FIGS. 1-6. Apparatus 200 may include chip module 202, which may include one or more integrated circuits, and which may include logic configured to perform any other suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device, a display (LCD, LED, OLED, etc.), a touchscreen or any other suitable media or devices, peripheral devices 206, which may include other computers, logical processing device 208, which may compute data information and structural parameters of various applications, and machine-readable memory 210.

Machine-readable memory 210 may be configured to store in machine-readable data structures: machine executable instructions (which may be alternatively referred to herein as "computer instructions" or "computer code"), applications, signals, recorded data, and/or any other suitable information or data structures. The instructions and data may be encrypted.

Components 202, 204, 206, 208 and 210 may be coupled together by a system bus or other interconnections 212 and may be present on one or more circuit boards such as 220. In some embodiments, the components may be integrated into a single chip. The chip may be silicon-based.

Figure 3:
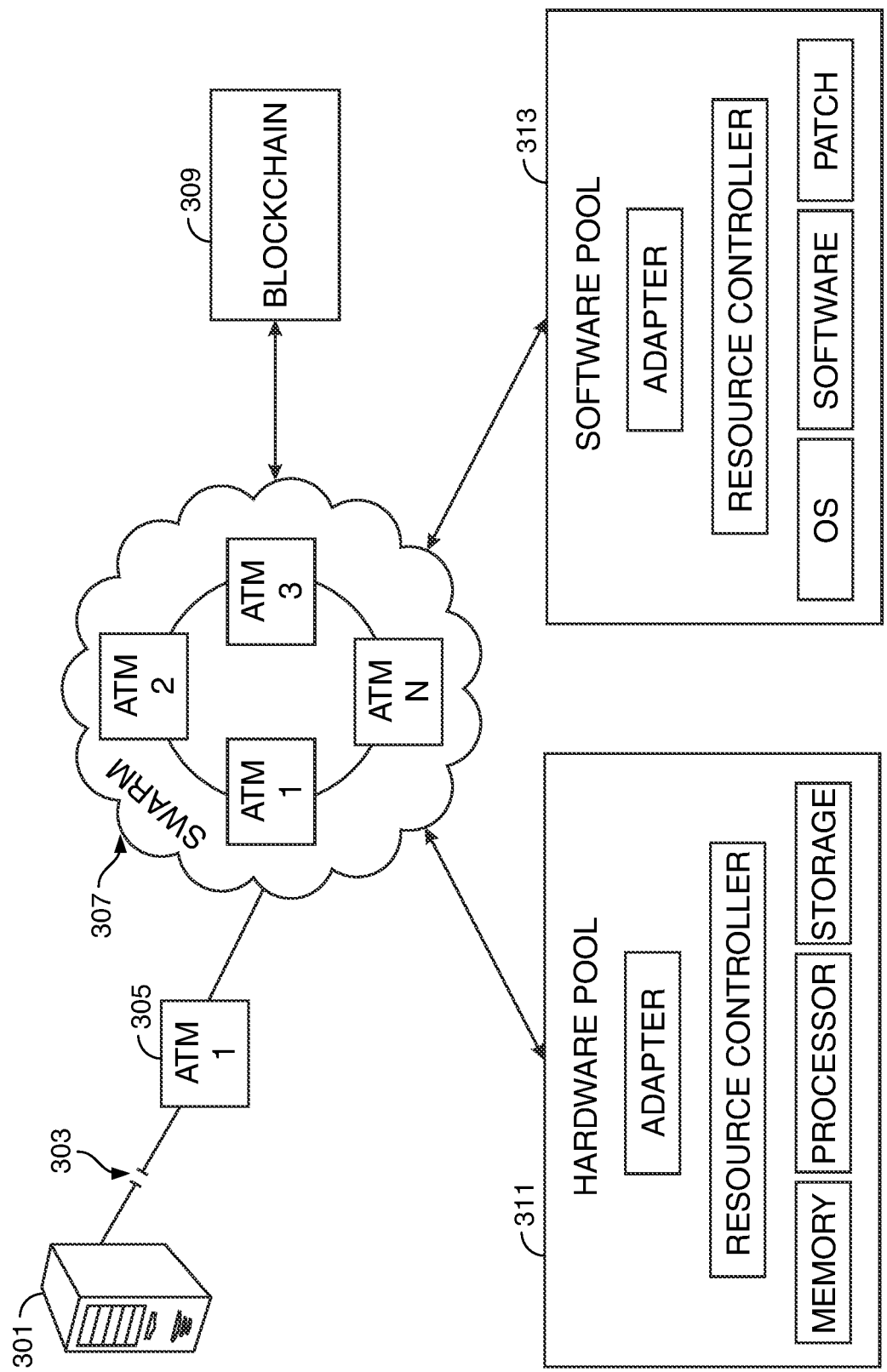
FIG. 3 shows an illustrative schematic in accordance with principles of the disclosure.

FIG. 3 shows an illustrative schematic in accordance with principles of the disclosure. Apparatus may include any of the components and systems numbered 301 through 313, among other components.

An ATM (ATM 1) 305 may lose connection (wired or wireless) 303 with financial institution server 301. Detection of the loss of connection may be automatic. The ATM 305 may test connection at pre-determined periods, at random times, as necessary, or otherwise.

ATM1 305 may form an ad-hoc network 307 with other geographically nearby ATMs (ATM1, ATM2, ATM3, . . . ATM'N'). Ad-hoc network 307 may incorporate one or more swarm intelligence algorithms in its protocols for running the ad-hoc network. Any suitable swarm intelligence method may be used, as described in this disclosure.

The ad-hoc network 307 may include a distributed ledger 309. The distributed ledger 309 may be a blockchain.

The ATMs in the ad-hoc network 307 may form a hardware pool 311 and a software pool 313. Each ATM on the network 307 may draw resources from either pool 311 or pool 313 as necessary.

Hardware pool 311 may include one or more adapters, one or more resource controllers, available memory, available processor cycles, available storage, and other available hardware for use by other ATMs in the network 307. Swarm intelligence algorithms may be used to prioritize requests for hardware resources, among other things.

Software pool 313 may include one or more adapters, one or more resource controllers, available operating systems, available software, available patches, and other available software for use by other ATMs in the network 307. Swarm intelligence algorithms may be used to prioritize requests for software resources, among other things.

For example, if an ATM in the network 307 was in the process of patching its software from server 301 when connection was lost 303, it may attempt to complete the patch using the resources in the software pool 313, and possibly hardware pool 311.

Figure 4:
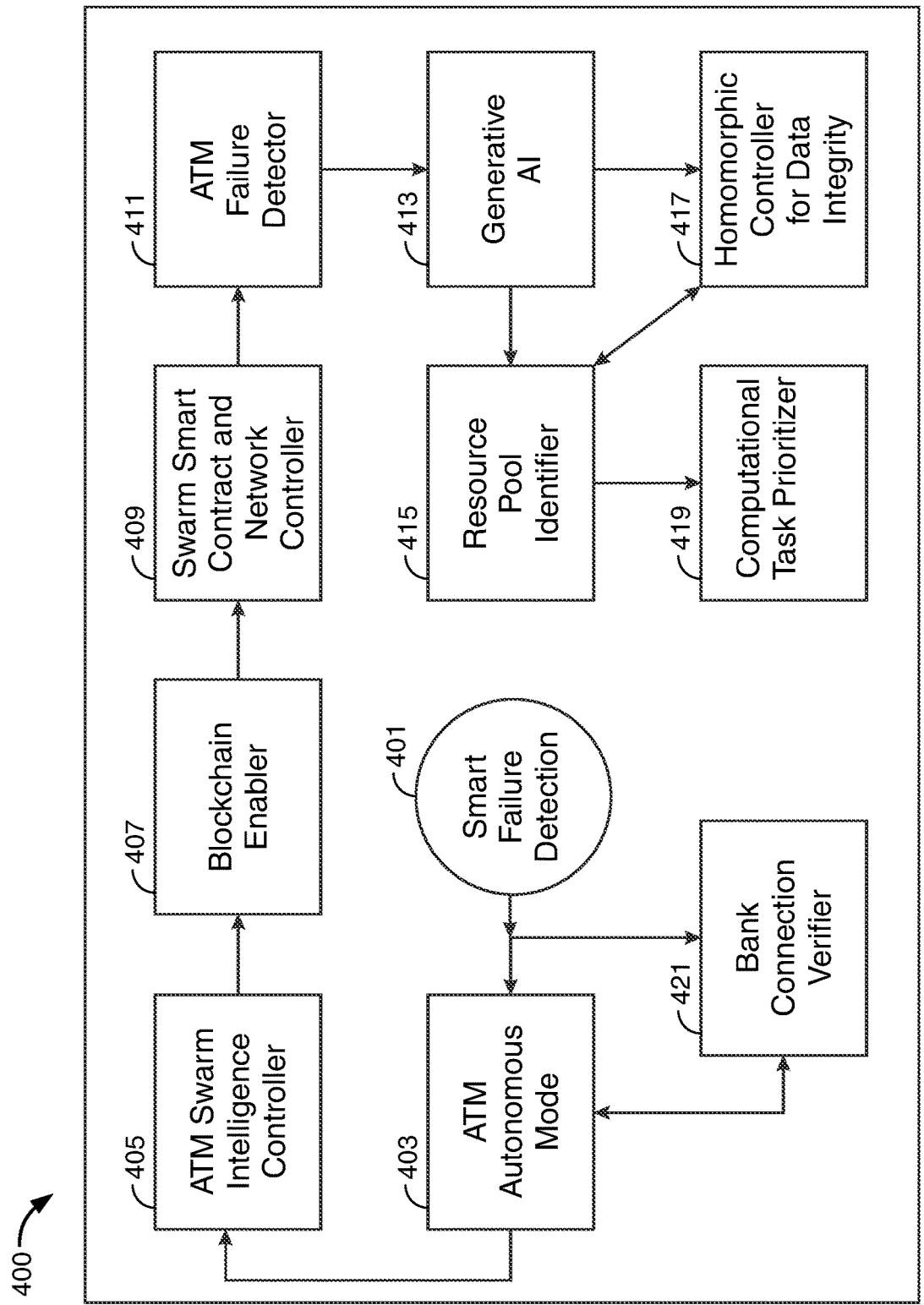
FIG. 4 shows an illustrative schematic in accordance with principles of the disclosure.

FIG. 4 shows an illustrative schematic in accordance with principles of the disclosure. Apparatus may include any of the components and systems numbered 400 through 421, among other components. Steps may be performed on the apparatus shown in FIGS. 1-3, and 6 or other apparatus shown in other figures or described elsewhere.

A smart failure detection module 401 on an ATM 400 may detect a failure in a connection with a financial institution server. The smart failure detection module 401 may use a bank connection verifier module 421. The ATM 400 or failure detection module 401 may periodically or constantly check for connection with the financial institution through verifier 421.

After a failure is detected, the ATM 400 may enter an ATM autonomous mode 403 and enter into an ad-hoc network with other nearby ATMs (not shown).

Autonomous mode 403 may include an ATM swarm intelligence controller 405 and a blockchain or other distributed ledger module 407. The swarm intelligence controller 405 may create a swarm intelligence protocol ad-hoc network with other nearby ATMs.

The blockchain module 407 may include an encryption module 417. The encryption module 417 may include a homomorphic encryption controller.

The blockchain module 407 may include one or more smart contracts 409. The smart contracts 409 may be code or other processes that perform functions on a distributed ledger once activated and entered into by one or more nodes on the distributed ledger. The smart contracts 409 may include one or more swarm intelligence smart contracts and network controllers. A network controller may include rules or processes by which a network is run and processes and prioritizes data flow over the network.

The ATM 400 may include an ATM failure detector 411. Failure detector 411 may determine when there is a fault within an ATM's hardware or software.

In another embodiment, failure detector 411 may instead be a module to accept one or more requests for a financial transaction from a customer. Such a financial transaction may be, inter alia, a request to withdraw money or deposit money, a request to check balances, etc.

Once a failure is detected by the detector 411, or a request for a financial transaction is received, an AI module 413 on the ATM 400 will process the failure or request. Any appropriate AI/ML algorithm or algorithms may be used. The AI may be a generative AI in that it may generate solutions to a failure or request.

The AI module 413 may use a resource pool identifier module 415 to identify available resources as required in hardware and software resource pools generated by the ATMs in the ad-hoc network. The ad-hoc network may prioritize 419 the computational and other tasks requested by each AI module 413 of each ATM on the network. The prioritization 419 may use swarm intelligence algorithm(s) to determine priority.

Figure 5:
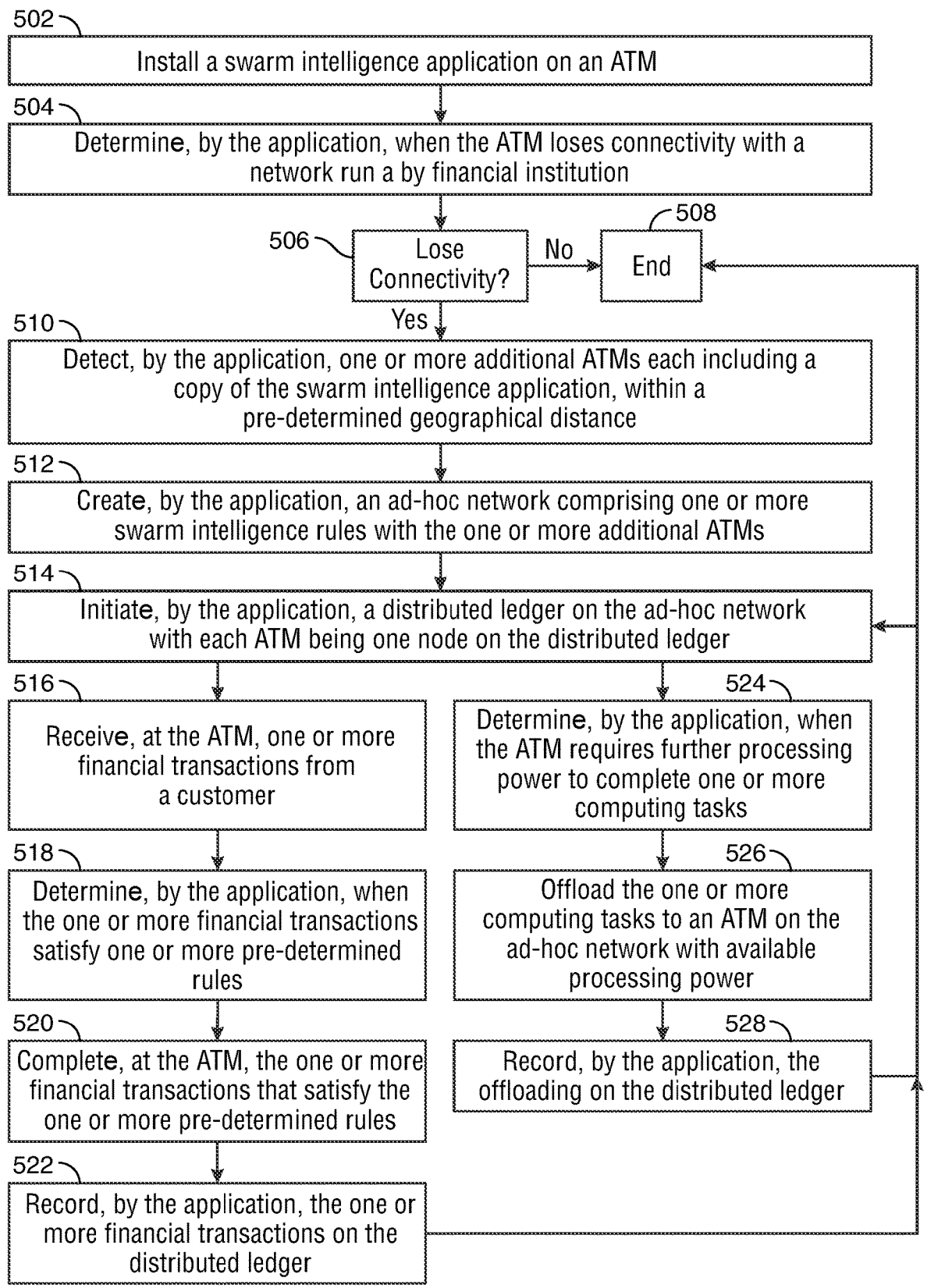
FIG. 5 shows an illustrative flowchart in accordance with principles of the disclosure.

FIG. 5 shows an illustrative flowchart in accordance with principles of the disclosure. Methods may include some or all of the method steps numbered 502 through 528. Methods may include the steps illustrated in FIG. 5 in an order different from the illustrated order. The illustrative method shown in FIG. 5 may include one or more steps performed in other figures or described herein. Steps 502 through 516 may be performed on the apparatus shown in FIGS. 1-4, 6 or other apparatus.

At step 502, a swarm intelligence application may be installed on an ATM.

In an embodiment, a system administrator may install the application.

In an embodiment, an AI/ML algorithm may install the application.

The application may include multiple modules. The application may be arranged and compiled in any appropriate method.

At step 504, the application may check and determine when the ATM loses connectivity with a network or server run by a financial institution. Any appropriate standard method or program to check connectivity with a network or server may be used.

At step 506, the application may learn whether the connection was lost or not. If not, at step 508, the method may end.

When the connection has been lost, at step 510, the application may detect one or more additional ATMs located within a pre-determined geographical distance, each with a copy of the application installed. The pre-determined geographical distance may be set by a system administrator or set by the application. The distance may be variable. The distance may be enlarged if the application determines that not enough ATMs were detected. The distance may be shortened if the application determines that too many ATMs were detected. The appropriate number of ATMs may depend on the swarm intelligence algorithm(s) included with the application.

The application may detect the additional ATMs over a network. The network may be an intranet. The network may be the Internet.

At step 512, the application may create an ad-hoc network with the detected one or more additional ATMs. In an embodiment, the ad-hoc network may include one or more swarm intelligence network rules or processes to determine how data is shared, prioritized, and communicated over the ad-hoc network. Other standard network protocols may also be used alone or in addition to swarm intelligence protocols.

At step 514, the application may initiate a distributed ledger on the ad-hoc network.

The distributed ledger may be a blockchain.

Each ATM on the ad-hoc network, the ATM and the one or more additional ATMs may be a node on the distributed ledger.

The distributed ledger may be conclave, i.e., private and not open to the public.

After step 514, the application may perform two or more separate functions, described insteps 516-522 and steps 524-528.

At step 516, the application may receive one or more financial transaction requests from one or more customers or users of the ATM. These requests may be requests for withdrawals, deposits, balance checks, or any other request that an ATM may be capable of receiving. The requests may be received from the customer being actually present at the ATM and inputting the request as normal.

In an embodiment, the customer may be authenticated. In this embodiment, the authentication server may be separate from the network run by the financial institution in which the ATM lost connectivity.

In an embodiment, the customer may be locally authenticated. For example, the ATM, or an ATM on the network, may have stored authentication details and credentials from a previous transaction. Or the ATM may compare signatures on the back of an ATM debit card to a signature by the customer. Or the ATM may compare a picture of the customer to the customer at the ATM.

At step 518, the application may analyze the one or more requests and determine when or if the request(s) satisfy one or more pre-determined rules. For example, when the ATM loses connectivity, a pre-determined rule may be that the maximum withdrawal would be $100 or another low amount. If the request is higher than $100, the request may be denied, or the request may be modified and lowered to $100.

In an embodiment, the pre-determined rules may vary depending on the type and level of authentication of the customer or user. For example, the more, and better authentication, the higher the withdrawal limit amount may be.

At step 520, when the request(s) satisfy the one or more pre-determined rules, the application may complete the one or more transactions at the ATM. For example, the ATM may complete the requested withdrawal, or deposit, etc.

At step 522, the application may record the completed transactions on the distributed ledger.

In an embodiment, the application may record all attempted transactions on the distributed ledger, along with the result (completed or not) of each attempted transaction.

After connectivity with the financial institution is restored, the distributed ledger may be shared with the financial institution. This may allow the financial institution to balance and confirm every account across the financial institution.

After the one or more financial transactions are recorded at the ledger, the application method may end at step 508, or return to step 514 and await further transactions or proceed with other functions.

At step 524, the application may determine that the ATM has a software or hardware failure that may require further hardware or software to fix. For example, the application may determine that the ATM requires further processing power to complete one or more computing tasks.

The ATMs on the ad-hoc network may create a pool of hardware resources and a pool of software resources available to every other ATM on the ad-hoc network.

At step 526, the application may offload the one or more computing tasks to an ATM with available resources, such as processing power or processor cycles, in the hardware pool. Similarly, if the application determines that additional software or software patch(es) are needed, the application may acquire that software from the software pool.

At step 528, the application may record the activity, i.e., accessing and using resources in the hardware and/or software pools, on the distributed ledger.

Once the ledger is shared with the financial institution when connectivity is restored, these entries on the ledger may allow a system or system administrator to audit the software and hardware usage of an ATM. This may allow for better security against malicious actors.

After the hardware and/or software usage is recorded at the ledger, the application method may end at step 508, or return to step 514 and await further requirements or proceed with other functions.

Figure 6:
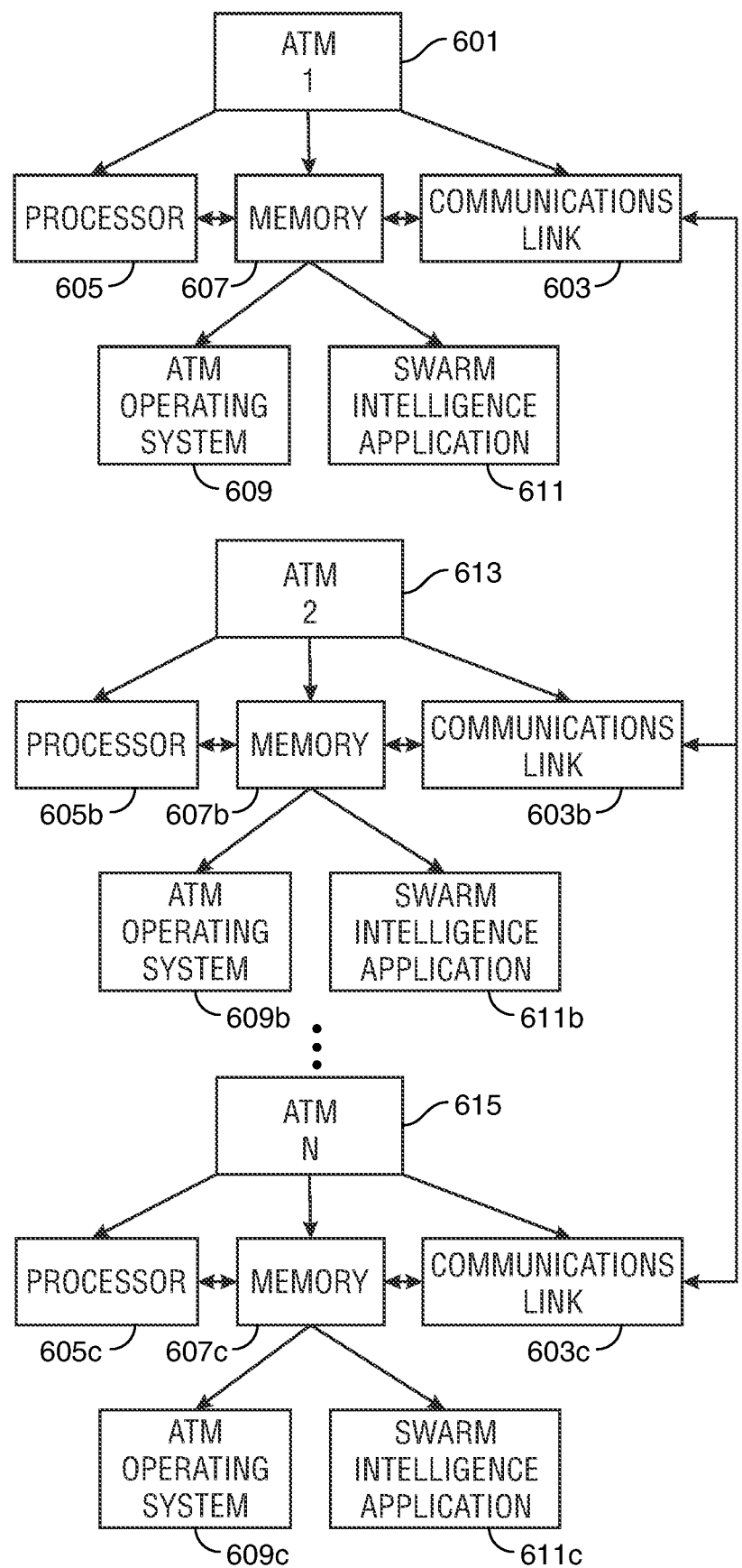
FIG. 6 shows an illustrative apparatus in accordance with principles of the disclosure.

FIG. 6 shows an illustrative apparatus in accordance with principles of the disclosure. The apparatus may include a first ATM 601, a second, additional ATM 613, and additional ATMs until ATM"N" 615, all within a pre-determined geographical radius.

The first ATM 601 may include a communications link 603, a processor/processors 605, and a non-transitory memory 607, as well as other components.

The second ATM 603 may include a communications link 603*b*, a processor/processors 605*b*, and a non-transitory memory 607*b*, as well as other components.

Each additional ATM until ATM"N" 615 may include a communications link 603*c*, a processor/processors 605*c*, and a non-transitory memory 607*c*, as well as other components.

The non-transitory memory 607, 607*b*, and 607*c* may include an ATM operating system 609, 609*b*, and 609*c* respectively, as well as a copy of a swarm intelligence application 611, as well as other data and programs.

The communications link 603 may communicate with every other ATM 613 and 615 (as well as other servers/computers, not shown, in a swarm intelligence ad-hoc network) through communications links 603, 603*b*, and 603*c* etc.

The swarm intelligence application 611 may be installed on each ATM.

The swarm intelligence application 611 may determine when the ATM on which it is installed loses connectivity with a network run by a financial institution.

The swarm intelligence application 611 may detect the one or more other ATMs 613 or 615 within a pre-determined geographical radius.

The swarm intelligence application 611 may create an ad-hoc network with the one or more other ATMs. The ad-hoc network may include one or more swarm intelligence rules and algorithms.

The swarm intelligence application 611 may initiate a distributed ledger on the ad-hoc network. Each ATM, 601, 613, 615 on the ad-hoc network may be one node on the distributed ledger.

The swarm intelligence application 611 may receive one or more financial transaction requests from a customer.

The swarm intelligence application 611 may determine when the one or more financial transactions satisfy one or more pre-determined rules.

When the one or more financial transaction requests satisfies, or can be modified to satisfy, the one or more pre-determined rules, the swarm intelligence application 611 may complete the one or more financial transactions.

The swarm intelligence application 611 may record the one or more attempted or completed financial transactions on the distributed ledger.

The swarm intelligence application 611 may determine when the ATM requires further hardware (e.g., processing power) resources or software resources to complete one or more computing tasks.

When the ATM requires additional resources, the swarm intelligence application 611 may offload the one or more computing tasks to an ATM on the ad-hoc network with available resources (e.g., processing power or cycles).

Thus, apparatus and methods for assembling and deploying computing tasks using swarm intelligence are provided. Persons skilled in the art will appreciate that the present invention can be practiced by other than the described embodiments, which are presented for purposes of illustration rather than of limitation.

What is claimed is:

1. A swarm intelligence computer program product installed on an automated teller machine ("ATM"), the computer program product comprising executable instructions, the executable instructions when executed by a processor on the ATM:

determine when the ATM loses connectivity with a network run by a financial institution;
detect one or more additional ATMs within a pre-determined geographical distance, wherein each additional ATM includes a copy of the swarm intelligence computer program product;
create an ad-hoc network with the one or more additional ATMs;
initiate a distributed ledger on the ad-hoc network, wherein the ATM is one node on the distributed ledger;
receive one or more financial transactions from a customer;
determine when the one or more financial transactions satisfy one or more pre-determined rules;
complete the one or more financial transactions that satisfy the one or more pre-determined rules; and
record the one or more financial transactions on the distributed ledger.

2. The swarm intelligence computer program product of claim 1 wherein the distributed ledger is a blockchain.

3. The swarm intelligence computer program product of claim 1 wherein the instructions further determine unused computing resources on the one or more additional ATMs.

4. The swarm intelligence computer program product of claim 3 wherein the instructions further determine when the unused computing resources are available for use by the ATM.

5. The swarm intelligence computer program product of claim 4 wherein the instructions determine when the one or more financial transactions satisfy one or more pre-determined rules by utilizing the unused computing resources.

6. The swarm intelligence computer program product of claim 1 wherein the instructions automatically modify the pre-determined geographical distance.

7. The swarm intelligence computer program product of claim 6 wherein the instructions automatically enlarge the pre-determined geographical distance when a total of additional ATMs is below a threshold value.

8. The swarm intelligence computer program product of claim 7 wherein the threshold value is ten.

9. The swarm intelligence computer program product of claim 2 wherein the blockchain is conclave.

10. The swarm intelligence computer program product of claim 1 wherein the instructions index and record a hardware profile of each ATM on the ad-hoc network at a pre-determined interval.

11. The swarm intelligence computer program product of claim 10 wherein the instructions index and record a software profile of each ATM on the ad-hoc network at a pre-determined interval.

12. The swarm intelligence computer program product of claim 11 wherein the instructions further create a pool of hardware resources available for an ATM on the ad-hoc network to utilize.

13. The swarm intelligence computer program product of claim 1 wherein data on the ad-hoc network is encrypted.

14. The swarm intelligence computer program product of claim 13 wherein the encryption is homomorphic.

15. The swarm intelligence computer program product of claim 12 wherein the instructions analyze one or more hardware needs of each ATM on the ad-hoc network.

16. The swarm intelligence computer program product of claim 15 wherein the instructions automatically prioritize the one or more hardware needs.

17. The swarm intelligence computer program product of claim 1 wherein the instructions use one or more artificial intelligence/machine learning ("AI/ML") algorithms.

18. The swarm intelligence computer program product of claim 1 wherein the ad-hoc network follows one or more swarm intelligence network rules.

19. An apparatus for a swarm intelligence automated teller machine ("ATM") network, the apparatus comprising:
two or more ATMs within a pre-determined radius, each ATM comprising:
a communication link;
a processor; and
a non-transitory memory configured to store at least:
an ATM operating system; and
a swarm intelligence application;
wherein the swarm intelligence application:
is installed on each ATM;
determines when the ATM on which the swarm intelligence application is installed loses connectivity with a network run by a financial institution;
detects the one or more other ATMs within the pre-determined radius;
creates an ad-hoc network with the one or more other ATMs, wherein the ad-hoc network comprises swarm intelligence rules;
initiates a distributed ledger on the ad-hoc network, wherein each ATM on the ad-hoc network is one node on the distributed ledger;
receives one or more financial transactions from a customer;
determines when the one or more financial transactions satisfy one or more pre-determined rules;
completes the one or more financial transactions that satisfy the one or more pre-determined rules;
records the one or more financial transactions on the distributed ledger;
determines when the ATM requires further processing power to complete one or more computing tasks; and
offloads the one or more computing tasks to an ATM on the ad-hoc network with available processing power.

20. A method for a swarm intelligence ATM network, the method comprising the steps of:
installing a swarm intelligence application on an ATM;
determining, by the application, when the ATM loses connectivity with a network run by a financial institution;
detecting, by the application, one or more additional ATMs within a pre-determined geographical distance, wherein each additional ATM includes a copy of the swarm intelligence application;
creating, by the application, an ad-hoc network with the one or more additional ATMs, wherein the ad-hoc network comprises one or more swarm intelligence rules;
initiating, by the application, a distributed ledger on the ad-hoc network, wherein the ATM is one node on the distributed ledger;
receiving, at the ATM, one or more financial transactions from a customer;
determining, by the application, when the one or more financial transactions satisfy one or more pre-determined rules;
completing, at the ATM, the one or more financial transactions that satisfy the one or more pre-determined rules;
recording, by the application, the one or more financial transactions on the distributed ledger;
determining, by the application, when the ATM requires further processing power to complete one or more computing tasks; and offloading the one or more computing tasks to an ATM on the ad-hoc network with available processing power.

* * * * *